US005939348A

United States Patent [19]

Mink et al.

[11] Patent Number: 5,939,348

[45] **Date of Patent: *Aug. 17, 1999**

[54] CATALYST FOR THE MANUFACTURE OF POLYTHYLENE WITH A NARROW MOLECULAR WEIGHT DISTRIBUTION

[75] Inventors: Robert I. Mink, Warren; Thomas E. Nowlin, West Windsor Township, both of N.J.

[73] Assignee: Mobil Oil Corporation, Fairfax, Va.

[ * ] Notice: This patent is subject to a terminal disclaimer.

[21] Appl. No.: 08/779,260

[22] Filed: Dec. 12, 1996

Related U.S. Application Data

[63] Continuation of application No. 08/540,143, Oct. 6, 1995, abandoned, which is a continuation-in-part of application No. 08/284,321, Aug. 2, 1994, abandoned, which is a continuation-in-part of application No. 08/151,666, Nov. 15, 1993, Pat. No. 5,470,812, which is a continuation-in-part of application No. 07/788,386, Nov. 6, 1991, Pat. No. 5,336, 652.

[51] Int. Cl.$^{6}$ .......................... C08F 4/654; C08F 4/656; C08F 10/02

[52] U.S. Cl. .......................... 502/115; 502/120; 526/128; 526/129

[58] Field of Search .................................. 502/110, 115

[56] References Cited

U.S. PATENT DOCUMENTS

| | | | |
|---|---|---|---|
| 3,787,384 | 1/1974 | Stevens et al. | 260/94.9 |
| 4,063,009 | 12/1977 | Ziegler et al. | 526/159 |
| 4,076,698 | 2/1978 | Anderson et al. | 526/348.6 |
| 4,113,654 | 9/1978 | Mayr et al. | 252/429 C |
| 4,148,754 | 4/1979 | Strobel et al. | 252/429 C |
| 4,173,547 | 11/1979 | Graff | 252/429 B |
| 4,212,961 | 7/1980 | Kobayashi et al. | 526/151 |
| 4,263,171 | 4/1981 | Shida et al. | 252/429 C |
| 4,302,566 | 11/1981 | Karol et al. | 526/125 |
| 4,335,016 | 6/1982 | Dombro | 252/429 B |
| 4,374,753 | 2/1983 | Pullukat et al. | 252/429 B |
| 4,378,304 | 3/1983 | Dombro | 252/429 B |
| 4,381,252 | 4/1983 | Sakurai et al. | 252/429 B |
| 4,383,939 | 5/1983 | Johnstone | 252/429 B |
| 4,385,161 | 5/1983 | Caunt et al. | 526/114 |
| 4,396,533 | 8/1983 | Johnstone | 252/429 B |
| 4,397,762 | 8/1983 | Johnstone | 252/429 B |
| 4,402,861 | 9/1983 | Hoff | 252/429 B |
| 4,434,083 | 2/1984 | van de Leemput et al. | 502/154 |
| 4,458,058 | 7/1984 | Dombro | 526/129 |
| 4,478,988 | 10/1984 | Pullukat et al. | 526/128 |
| 4,481,301 | 11/1984 | Nowlin et al. | 502/104 |
| 4,497,906 | 2/1985 | Hanji et al. | 502/110 |
| 4,524,141 | 6/1985 | Pullukat et al. | 502/107 |
| 4,525,469 | 6/1985 | Ueda et al. | 502/125 |
| 4,525,557 | 6/1985 | Heilman et al. | 526/128 |
| 4,530,912 | 7/1985 | Pullukat et al. | 502/104 |
| 4,530,913 | 7/1985 | Pullukat et al. | 502/104 |
| 4,540,753 | 9/1985 | Cozewith et al. | 526/88 |
| 4,558,023 | 12/1985 | Brun et al. | 502/108 |
| 4,558,024 | 12/1985 | Best | 502/115 |
| 4,562,169 | 12/1985 | Hagerty et al. | 502/107 |
| 4,565,795 | 1/1986 | Short et al. | 502/110 |
| 4,565,796 | 1/1986 | Etherton | 502/112 |
| 4,567,243 | 1/1986 | Pullukat et al. | 526/128 |
| 4,578,440 | 3/1986 | Pullukat et al. | 526/128 |
| 4,611,038 | 9/1986 | Brun et al. | 526/169.2 |
| 4,634,752 | 1/1987 | Hagerty et al. | 526/129 |
| 4,656,151 | 4/1987 | Shelly et al. | 502/113 |
| 4,665,141 | 5/1987 | Aylward | 526/86 |
| 4,672,050 | 6/1987 | Sasaki et al. | 502/116 |
| 4,678,767 | 7/1987 | Tachikawa et al. | 502/104 |
| 4,690,991 | 9/1987 | Seppala | 526/158 |
| 4,704,376 | 11/1987 | Blenkers et al. | 502/104 |
| 4,711,865 | 12/1987 | Speca | 502/116 |
| 4,748,221 | 5/1988 | Collomb et al. | 526/153 |
| 4,754,007 | 6/1988 | Pullukat et al. | 526/130 |
| 4,771,023 | 9/1988 | Sasaki et al. | 502/116 |
| 4,786,697 | 11/1988 | Cozewith et al. | 526/88 |
| 4,804,794 | 2/1989 | Ver Strate et al. | 585/12 |
| 4,829,038 | 5/1989 | Hoppin et al. | 502/125 |
| 4,849,390 | 7/1989 | Sano et al. | 502/113 |
| 4,916,099 | 4/1990 | Sasaki et al. | 502/126 |
| 4,923,935 | 5/1990 | Sano et al. | 526/73 |
| 4,940,682 | 7/1990 | Sasaki et al. | 502/113 |
| 5,006,619 | 4/1991 | Pullukat et al. | 526/128 |
| 5,021,382 | 6/1991 | Malpass, Jr. | 502/117 |
| 5,023,223 | 6/1991 | Ebara et al. | 502/116 |
| 5,028,671 | 7/1991 | Kioka et al. | 526/125 |
| 5,034,365 | 7/1991 | Buehler et al. | 502/119 |
| 5,063,188 | 11/1991 | Malpass et al. | 502/116 |
| 5,064,799 | 11/1991 | Monte et al. | 502/115 |
| 5,106,926 | 4/1992 | Eisinger et al. | 526/88 |
| 5,112,785 | 5/1992 | Brun et al. | 502/108 |
| 5,130,283 | 7/1992 | Murata et al. | 502/116 |

(List continued on next page.)

FOREIGN PATENT DOCUMENTS

| | | |
|---|---|---|
| 0 261 808 | 3/1988 | European Pat. Off. . |
| 0 306 939 | 12/1992 | European Pat. Off. . |
| WO 94/20546 | 9/1994 | WIPO . |

OTHER PUBLICATIONS

WO 93/09147, Nowlin, et al., "High Activity Polyethylene Catalysts Prepared With Alkoxysilane Reagents", (1993).

*Primary Examiner*—Edward J. Smith
*Attorney, Agent, or Firm*—Dennis P. Santini; Jessica M. Sinnott

[57] ABSTRACT

An ethylene-alpha-olefin copolymerization catalyst is prepared by impregnating a porous support, such as silica, with a contact mixture of an organomagnesium compound such as dialkyl magnesium and a silane compound which is free of hydroxyl groups, such as tetraethyl orthosilicate. A transition metal component such as titanium tetrachloride is then incorporated into the support in a specific ratio to the magnesium and silane components. Activation of this catalyst precursor with a trialkylaluminum compound results in a catalyst system which is effective for the production of ethylene copolymers.

5 Claims, No Drawings

U.S. PATENT DOCUMENTS

| | | | |
|---|---|---|---|
| 5,143,883 | 9/1992 | Buehler et al. | 502/119 |
| 5,145,821 | 9/1992 | Buehler et al. | 502/119 |
| 5,147,839 | 9/1992 | Fujita et al. | 502/119 |
| 5,153,158 | 10/1992 | Kioka et al. | 502/126 |
| 5,177,043 | 1/1993 | Koyama et al. | 502/125 |
| 5,191,042 | 3/1993 | Cozewith | 526/144 |
| 5,194,531 | 3/1993 | Toda et al. | 526/125 |
| 5,221,650 | 6/1993 | Buehler | 502/104 |
| 5,227,355 | 7/1993 | Seppala et al. | 502/125 |
| 5,231,151 | 7/1993 | Spencer et al. | 526/116 |
| 5,232,998 | 8/1993 | Buehler et al. | 526/125 |
| 5,244,853 | 9/1993 | Wang et al. | 502/116 |
| 5,258,342 | 11/1993 | Luciani et al. | 502/107 |
| 5,258,345 | 11/1993 | Kissin et al. | 502/116 |
| 5,275,991 | 1/1994 | Buehler et al. | 502/107 |
| 5,336,652 | 8/1994 | Mink | 502/125 |
| 5,470,812 | 11/1995 | Mink et al. | 502/125 |
| 5,514,634 | 5/1996 | Hagerty et al. | 502/125 |
| 5,561,091 | 10/1996 | Mink et al. | 502/115 |

CATALYST FOR THE MANUFACTURE OF POLYTHYLENE WITH A NARROW MOLECULAR WEIGHT DISTRIBUTION

CROSS-REFERENCE TO RELATED APPLICATION

This is a continuation of application Ser. No. 08/540,143, filed on Oct. 6, 1995, now abandoned, which is a continuation in part of application Ser. No. 08/284,321 filed Aug. 2, 1994, now abandoned, which is a continuation in part of application Ser. No. 08/151,666 filed Nov. 15, 1993, (now U.S. Pat. No. 5,470,812), which in turn is a continuation in part of application Ser. No. 07/788,386, filed Nov. 6, 1991 (now U.S. Pat. No. 5,336,652), each of which is relied upon and is expressly incorporated by reference herein.

FIELD OF THE INVENTION

The invention relates to a new technique for preparing a high-activity catalyst for olefin polymerization. It includes interaction of dialkylmagnesium compound with tetraalkyl orthosilicate in an inert solvent, followed, sequentially, by the addition of silica and titanium tetrachloride. This procedure provides a high activity olefin polymerization catalyst that produces ethylene copolymers with a relatively narrow molecular weight distribution.

BACKGROUND OF THE INVENTION

Two major application areas of ethylene/alpha-olefin copolymers high density polyethylene (HDPE) and linear low density polyethylene (LLDPE) resins, include film and injection-molded articles.

When HDPE or LLDPE resins are fabricated into injection-molded products, it is imperative to assure that the manufacture of such products is not accompanied by warping or shrinking. As is known to those skilled in the art, the degree of warping or shrinking can be predicted from the molecular weight distributions of the resins. Resins having relatively narrow molecular weight distribution produce injection-molded products exhibiting a minimum amount of warping or shrinkage. Conversely, resins having relatively broader molecular weight distributions, produce injection-molded products more likely to suffer from warping or shrinkage.

One of the measures of the molecular weight distribution of an LLDPE or a HDPE resin is the melt flow ratio (MFR), which is the ratio of the high-load melt index ($I_{21}$) to the melt index ($I_2$) for a given resin:

$$MFR=I_{21}/I_2$$

The melt flow ratio is an indication of the molecular weight distribution of the polymer: the higher the MFR value, the broader the molecular weight distribution. Resins having relatively low MFR values, e.g., of about 20 to about 30, have relatively narrow molecular weight distributions. LLDPE resins having such relatively low MFR values produce warpage-free injection-molded articles and film with better strength properties compared to resins with high MFR values.

Another important property of an ethylene/alpha-olefin copolymerization catalyst is the ability to effectively copolymerize ethylene with higher alpha-olefins, e.g., $C_3$–$C_{10}$ alpha-olefins, and to produce LLDPE resins with low densities. Such resins have important advantages. They are used to produce LLDPE film which has excellent physical properties, and, in particular, is substantially more resistant to tearing and puncturing than a film made from similar resins of higher densities. This property of the catalyst is referred to as "alpha-olefin incorporation property" and is usually evaluated by determining the amount of an alpha-olefin (e.g., 1-butene, 1-hexene or 1-octene) required in the polymerization process to produce an ethylene copolymer with a given density. The lower is the amount of the alpha-olefin required to produce a resin of a given density, the higher is the production rate and, therefore, the lower is the cost of producing such a copolymer. High alpha-olefin incorporation ability is especially important in the gas-phase fluidized-bed processes, because relatively high concentrations of an alpha-olefin in the fluidized-bed reactor may cause poor fluidization due to resin stickiness. To avoid it, production rates must be significantly reduced. Consequently, catalyst compositions with a relatively high alpha-olefin incorporation ability avoid these problems and are more desirable.

SUMMARY OF THE INVENTION

A supported ethylene/alpha-olefin copolymerization catalyst composition of this invention is prepared in a multi-step process. The process comprises forming a slurry by mixing a solid, porous carrier and a mixture consisting of (1) a non-polar solvent free of any electron donor solvent(s), (2) at least one organomagnesium compound of the formula $R_mMgR'_n$ where R and R' are the same or different alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is equal to the valence of Mg, and (3) at least one silane compound of the formula $R^1_xSiR^2_y$ wherein x is 1, 2, 3, or 4 and y is 0, 1, 2, or 3, provided that x+y is 4; $R^1$ is the $R_w$—O alkoxy group wherein $R_w$ is a hydrocarbyl group of 1 to 10 carbon atoms; and $R^2$ is a halogen atom, preferably chlorine, or a hydrocarbyl group of 1 to 10 carbon atoms, or a hydrogen atom.

The mixture is then contacted with at least one transition metal compound soluble in the non-polar solvent, to form a transition metal containing intermediate (or the catalyst precursor). The transition metal-containing intermediate is subsequently contacted with a cocatalyst, trialkylaluminum compound.

The resulting activated catalyst composition has a substantially higher productivity in the copolymerization of ethylene with alpha-olefins and substantially improved alpha-olefin incorporation properties compared to similar catalyst compositions prepared without the silane. The catalyst can produce ethylene copolymers having relatively narrow molecular weight distributions and low densities.

DETAILED DESCRIPTION OF THE INVENTION

The invention is directed to forming certain catalysts for ethylene-olefin copolymerization. In accordance with preferred embodiments of the invention, the proportions of the components of the catalyst precursor of the invention satisfy the equation K=[Ti]/([Mg]+4[Si]) which is less than 0.4 and preferably 0.23 to 0.31. The "[Ti]", "[Mg]"and "[Si]"in the formula refer to the concentrations of Ti (provided by the transition metal compound, e.g. $TiCl_4$); the concentration of Mg provided by the organomagnesium compound and the concentration of Si provided by the silane compound. The concentration of each is calculated in units of mmol/gram of silica support; outside of this K range, the toughness of the resins produced in polymerization reactions catalyzed by the catalysts of the invention and the strength of the films fabricated therefrom decline.

Herein, a new process for the production of these catalysts is described. The new process is directed to optimizing the mixing of the components of the catalyst in order to maintain the activity/productivity of the catalyst in scale-up synthesis and commercial manufacture. Catalysts produced according to aspects of the present invention may be described in terms of the manner in which they are made.

Suitable carrier materials for the catalyst precursors include solid, porous materials such as silica, alumina and combinations thereof. Such carrier materials may be amorphous or crystalline. These carriers may be in the form of particles having a particle size of from 0.1 micron to 250 microns, preferably from 10 to 200 microns, and most preferably from 10 to 80 microns. Preferably, the carrier is shaped in the form of spherical particles, e.g., spray-dried silica. The carrier material should be porous. The internal porosity of these carriers may be larger than 0.2 $cm^3/g$. The specific surface area of these materials is at least 3 $m^2/g$, preferably at least 50 $m^2/g$, and more preferably from, 150 to 1500 $m^2/g$.

It is desirable to remove physically bound water from the carrier material prior to contacting it with catalyst ingredients. This water removal may be accomplished by heating the carrier material to a temperature from about 100° C. to the temperature at which sintering of the carrier occurs. A suitable range of temperatures may be from 100° C. to 800° C., better from 150° C. to 650° C.

If the chosen carrier is porous silica, silanol groups in the carrier may be present when the carrier is contacted with catalyst ingredients in accordance with an aspect of the present invention. The silanol groups may be present in an amount from about 0.5 to about 5 mmol of OH groups per gram of carrier but a preferred range is from about 0.3 to about 0.9 mmol of OH groups per gram of carrier. Excess OH groups present in the carrier may be removed by heating the carrier for a sufficient time at a sufficient temperature. A relatively small number of OH groups may be removed by heating the carrier from about 150° C. to about 250° C., whereas a relatively large number of OH groups may be removed by heating at 500 to 800° C., most especially, from about 550° C. to about 650° C. The duration of the heating may be from 16 to at least 4 hours. In a most preferred embodiment, the carrier is silica which, prior to the use thereof in the first catalyst synthesis step, has been dehydrated by fluidizing it by nitrogen or air and heating to at least 600° C. for 4–16 hours to achieve a surface hydroxyl group concentration of about 0.7 mmol per gram. The surface hydroxyl concentration of silica may be determined according to J. B. Peri and A. L. Hensley, Jr., *J. Phys. Chem.,* 72 (8), 2926 (1968). Internal porosity of carriers can be determined by a method termed the BET-technique, described by S. Brunauer, P. Emmett and E. Teller in *Journal of the American Chemical Society,* 60, pp. 209–319 (1938). Specific surface areas of carriers can be measured in accordance with the above-mentioned BET-technique with use of the standardized method as described in *British Standards* BS 4359, Volume 1, (1969). The silica of the most preferred embodiment is a high surface area, amorphous silica with the surface area=300 $m^2/g$ and pore volume of 1.65 $cm^3/g$. It is a material marketed under the tradenames of Davison 952 or Davison 955 by the Davison Chemical Division of W. R. Grace and Company.

While heating is a preferred means of removing OH groups inherently present in a carrier such as silica, other removal means are also possible such as chemical means. For example, a desired proportion of OH groups may be reacted with a chemical agent such as an organoaluminum compound, e.g., triethylaluminum.

Other examples of suitable carrier materials are described in the Graff, U.S. Pat. No. 4,173,547 in the passage extending from column 3, line 62, to column 5, line 44.

The carrier material is slurried in a mixture containing a non-polar solvent, an organomagnesium compound and a silane compound described below. Preferably all subsequent steps for catalyst precursor preparation are conducted at these temperatures about 25 to about 80° C., preferably to about 40 to about 65° C. to ensure maximum catalyst activity.

Suitable non-polar solvents are materials in which all of the reactants used herein, e.g., the organomagnesium compound, the silane compound, and the transition metal compound, are at least partially soluble and which are liquid at reaction temperatures. Preferred non-polar solvents are alkanes, such as isopentane, n-hexane, isohexane, n-heptane, octane, nonane, and decane, although a variety of other materials including cycloalkanes, such as cyclohexane, aromatics, such as toluene and ethylbenzene, may also be employed. The most preferred non-polar solvents are isopentane, isohexane and heptane. As indicated above, the solvent should be free of electron donors and electron donor solvents; because those electron donor(s) can react with the organomagnesium compound. Prior to use, the non-polar solvent should be purified, such as by percolation through silica gel and/or molecular sieves, to remove traces of water, oxygen, polar compounds, and other materials capable of adversely affecting catalyst activity.

The organomagnesium compound has the empirical formula $R_mMgR'_n$ where R and R' are the same or different $C_2$–$C_{12}$ alkyl groups, preferably $C_4$–$C_{10}$alkyl groups, more preferably $C_4$–$C_8$ alkyl groups, and most preferably both R and R' are butyl groups, and m and n are each 0, 1 or 2, providing that m+n is equal to the valence of Mg.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups in the carrier will vary and must be determined on a case-by-case basis to assure that only so much of the organomagnesium compound is added as will be deposited onto the support without leaving any excess of the organomagnesium compound in the solution. Because the molar amount of the organomagnesium compound deposited onto the support is greater than the molar content of hydroxyl groups in the support, the molar ratios given below are intended only as an approximate guideline and the exact amount of the organomagnesium compound in this embodiment must be controlled by the functional limitation discussed above, i.e., it must not be greater than that which can be deposited onto the support. The amount of the organomagnesium compound which is deposited onto the support can be determined by adding the organomagnesium compound to the slurry of the carrier until the organomagnesium compound is detected in the solvent.

For example, for the silica carrier heated at about 600° C., the amount of the organomagnesium compound added to the slurry is such that the molar ratio of Mg to the hydroxyl groups in the carrier is about 1:1 to about 4:1, preferably about 1.1:1 to about 2.8:1, more preferably about 1.2:1 to about 1.8:1 and most preferably about 1.4:1.

The silane compound used in the production of the catalyst composition of the invention should be free of hydroxy groups. The preferred species of silane compound are those defined by $Si(OR)_4$ wherein R is a $C_1$–$C_{10}$ hydrocarbyl group, preferably a hydrocarbyl group of 2 to 6 carbon atoms. Hydrocarbyl groups include alkyl, aryl, arylalkyl, alkenyl and arylalkenyl, containing 1 to 10 carbon atoms. Specific silane compounds which can be used in accordance with the invention include tetramethoxysilane, tetraethoxysilane, tetraisopropoxysilane, tetrapropoxysilane, tetrabutoxysilane, tetraphenoxysilane, tetrakis(2-methoxyethoxy)silane, tetrakis(2-ethylhexoxy) silane, and tetraallyloxysilane.

The amount of the silane compound is such that the molar ratio of the silane compound to Mg is about 0.40 to about 1.00, preferably about 0.50 to about 0.80, more preferably about 0.55 to about 0.75 and most preferably about 0.66. For the preparation of higher density (at least 0.94 g/cc) polymers and copolymers of ethylene, it was discovered that the catalyst exhibits higher activity when the catalyst is prepared with a total [silane]:[Mg] molar ratio at the minimum end of the range of 0.4 to 1.0, that is, at about 0.4 rather than at about 1.0.

Formation of the contact mixture of the organomagnesium compound, the silane compound and the inert solvent with subsequent slurrying of the carrier therein obviates the necessity of equipment requiring high-mixing capabilities for the commercial scale-up of catalyst production. Therefore, the present synthetic method particularly allows for a complete contact of all components on any scale. In preferred embodiments, the mixture of the organomagnesium compound, the silane compound and the inert solvent is prepared first and subsequently the carrier is slurried therein prior to precipitation of any components from the solution. The total amount of the silane compound may be added in one step to form the liquid mixture. However, the invention contemplates addition of only a portion of the total amount of the silane compound to the mixture with a subsequent addition of the remaining portion of the silane to the silica slurry. In accordance with the invention, it is most preferred to add all silane to the slurry of carrier prior to incorporating transition metal compound into the catalyst precursor.

Finally, the slurry is contacted with at least one transition metal compound soluble in the non-polar solvent, preferably, after the addition of the silane compound is completed. This synthesis step is conducted at about 25 to about 70° C., preferably at about 30 to about 65° C., and most preferably at about 45 to about 60° C. In a preferred embodiment, the amount of the transition metal compound added is not greater than that which can be deposited onto the carrier. The exact molar ratio of Mg to the transition metal will therefore vary (depending, e.g., on the carrier drying temperature) and must be determined on a case-by-case basis. For example, for the silica carrier heated at about 200 to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of Mg to the transition metal is about 0.5 to about 3, preferably about 1 to about 2. These molar ratios provide catalyst compositions which produce HDPE and LLDPE resins having relatively low melt flow ratio values of about 20 to about 30. In particular, catalysts of the invention allow for the production of LLDPE resins characterized by MFR values less than 27. Film made of these LLDPE products exhibits excellent dart drop impact resistance and enhanced MD Elmendorf tear strength. As is known to those skilled in the art, such LLDPE resins can be utilized to produce high-strength film or injection molding products which are resistant to warping and shrinking.

Suitable transition metal compounds used herein are compounds of metals of Groups IVA, VA, VIA or VIII of the Periodic Chart of the Elements, as published by the Fisher Scientific Company, Catalog No. 5-702-10, 1978 providing that such compounds are soluble in the non-polar solvents. The preferred transition metal compounds are titanium compounds, preferably tetravalent titanium compounds. The most preferred titanium compound is titanium tetrachloride. Mixtures of transition metal compounds may also be used and generally no restrictions are imposed on the transition metal compounds which may be included. Any transition metal compound that may be used alone may also be used in conjunction with other transition metal compounds. Preferred solvents for the tetravalent titanium compounds are isohexane or isopentane.

The solution of the transition metal compound, such as the tetravalent titanium compound is added to the slurry containing solid carrier and is heated to a suitable reaction temperature, e.g., to the reflux temperature of the solvent.

The supported catalyst precursor formed from the four components described above is then activated with suitable activators. They include organometallic compounds. Preferably, the activators are trialkylaluminum compounds which contain alkyl groups of 1 to 6 carbon atoms, preferably 1 to 4 carbon atoms. More preferably, the activators are triethylaluminum or trimethylaluminum. The most active catalyst is formed when the activator is trimethylaluminum.

The catalyst may be activated in situ by adding the activator and catalyst precursor separately to the polymerization medium. It is also possible to combine the catalyst precursor and activator before introduction into the polymerization medium, e.g., for up to about 2 hours at a temperature from about −40 to about 80° C.

A suitable amount of the activator expressed as the number of moles of the activator per gram atom of titanium in the catalyst may be from about 1 to about 100 and is preferably greater than 5.

Ethylene and alpha-olefins may be copolymerized with the catalysts prepared according to aspects of the present invention by any suitable process. Such processes include polymerization reactions carried out in suspension, in solution or in the gas phase. Gas phase polymerizations are preferred such as those taking place in stirred bed reactors and, especially, fluidized bed reactors. With the catalysts produced according to aspects of the present invention, molecular weight of the polymers may be suitably controlled with hydrogen when the polymerization is carried out at relatively low temperatures, e.g., from about 30 to about 105° C. This control of molecular weight may be evidenced by a positive change in melt indexes ($I_2$ and $I_{21}$) of the polymer.

The catalysts prepared according to aspects of the present invention are highly active and may have an activity of at least from about 3,000 to about 10,000 gram of polymer produced per hour per gram of catalyst per 100 psi of ethylene pressure.

The catalysts prepared according to aspects of the present invention are particularly useful for the production of HDPE and LLDPE resins with densities below of 0.96. The LLDPE resins may have a density of 0.94 g/cc or less, preferably 0.930 or less or even 0.925 g/cc or less. In accordance with certain aspects of the present invention, it is possible to achieve densities of less than 0.915 g/cc and even 0.900 g/cc.

These LLDPE resins may be polymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

The molecular weight distribution of the polymers prepared in the presence of the catalysts of the present invention, as expressed by the MFR value, varies from about 20 to 30, and is preferably 24–28, for LLDPE products having a density of about 0.900 to about 0.940 g/cc and an $I_2$ (value) of about 0.1 to about 100. As is known to those skilled in the art, such MFR values are indicative of a relatively narrow molecular weight distribution of the polymers. The relatively low MFR values of polymers prepared with the catalysts of this invention also indicate that they are suitable for the preparation of various film products since such films are likely to have excellent strength properties.

Ethylene copolymers produced in accordance with certain aspects of the present invention preferably contain at least about 80 percent by weight of ethylene units. Most preferably, the LLDPE resins of the invention contain at least 2 weight percent, for example from 2 to 20 weight percent of an alpha-olefin.

Preferably, the polymerization reaction is conducted by contacting a stream of the monomers, in a gas-phase process, such as in the fluidized bed process described below with a catalytically effective amount of the completely activated catalyst at a temperature and at a pressure sufficient to initiate the polymerization reaction.

In order to achieve the desired density ranges in the copolymers it is necessary to copolymerize enough of the alpha-olefin comonomers with ethylene to achieve a level of 1 to 5 mol percent of the $C_4$ to $C_8$ comonomer in the copolymer. The amount of comonomer needed to achieve this result will depend on the particular comonomer(s) employed.

In accordance with the invention, it has unexpectedly been found that using catalysts of the invention in a gas-phase catalytic polymerization reaction, 1-hexene can be incorporated into ethylene copolymer chains with a high efficiency: a relatively small concentration of 1-hexene in the gas phase can lead to a relatively large incorporation of 1-hexene into the copolymers. Thus, 1-hexene can be incorporated into an ethylene copolymer chain in a gas-phase reactor in amounts up to 15 percent by weight, preferably 4 to 12 percent by weight, to produce LLDPE resins having a density of less than 0.940 g/cc.

In gas-phase polymerization in a fluidized-bed reactor, the polymerization temperature should be held below the sintering temperature of polymer particles. For the production of ethylene copolymers in the process of the present invention, an operating temperature of about 30° to 115° C. is preferred and a temperature of about 75° to 95° C. is most preferred. Temperatures of 75° to 90° C. are used to prepare LLDPE products having a density of 0.91 to 0.92, temperatures of 80° to 100° C. are used to prepare LLDPE products having a density of 0.92 to 0.94, and temperatures of 90° to 115° C. are used to prepare HDPE products having a density of 0.94 to 0.96.

The fluidized-bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas. The partially or completely activated catalyst composition is injected into the bed at a rate equal to its consumption. The production rate in the bed is controlled by the rate of the catalyst injection. The feed stream of gaseous monomer, with or without inert gaseous diluents, is fed into the reactor at a space time yield of about 2 to 10 pounds/hour/cubic foot of the bed volume.

The highly active support catalyst system of this invention yields a fluidized-bed product having an average particle size between about 0.01 to about 0.07 inches and preferably 0.02–0.04 inches.

Resins produced with catalysts of the invention exhibit excellent mechanical properties. Although there may be differences in catalyst productivity and 1-hexene incorporation, which vary with the type of the trialkylaluminum activator used in the gas-phase fluidized-bed reactor, excellent mechanical properties of the LLDPE resins inhere in the catalyst precursors of the invention independently of the identity of the cocatalyst.

The LLDPE film exhibits unexpectedly high dart drop impact strength and enhanced MD Elmendorf tear strength compared to commercial standards.

Slot-cast films formed from ethylene/1-hexene LLDPE resins with density of from 0.916 to 0.92 g/cm$^3$ have especially desirable properties as pallet strength wrap.

The following Examples give examples of reactants and parameters which may be used in accordance with aspects of the present invention.

EXAMPLES

Example 1

24.7 g of dry heptane was added under a dry nitrogen atmosphere to a 100 ml pear flask containing a magnetic stirring bar. 8.2 ml of a 0.736 molar solution of dibutylmagnesium (6.04 mmol) in heptane was added at room temperature to the flask followed by the addition of 1.34 ml of neat tetraethyl orthosilicate (6.00 mmol). The contents of the flask were stirred for 50 min. and then 6.09 g of Davison-grade 955 silica (previously calcined at 600° C. for twelve hours) was added to the flask. The flask was placed into an oil bath held at 55–60° C. and stirring continued for 50 min. Next, 2.2 ml of a 2.717 molar solution of titanium tetrachloride (5.98 mmol) in heptane was added to the flask and stirring continued for 40 min. Finally, the heptane was removed by evaporation with a nitrogen purge and 9.96 g of a free-flowing catalyst powder was obtained.

Example 2

Typical polymerization conditions were as follows: A 1.6-liter stainless-steel autoclave at 48° C. was filled with 0.50 l of dry heptane and 0.175 l of dry 1-hexene, and 3.0 mmol of trimethylaluminum (TMA) was added to the reactor while under a slow nitrogen purge. Then the reactor vent was closed, the stirring rate was set at 900 rpm, the internal temperature was increased to 80° C., and the internal pressure was raised with hydrogen from 5.0 psi to 25 psi. Ethylene was introduced to maintain the pressure at 120 psig. Next, 0.0367 g of catalyst precursor of EXAMPLE 1 was introduced into the reactor with ethylene over-pressure and the temperature was increased and held at 85° C. The polymerization reaction was continued for 60 min, then the ethylene supply was stopped and the reactor was cooled to room temperature. A yield of 127.1 g of polyethylene was collected. Flow index ($I_{21}$) of this polymer was 26.0 and the MFR value was 25.2. The polymer contained 2.45 mol % 1-hexene.

Thus it is apparent that there has been provided, in accordance with the invention, a process for catalyst production, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for production of ethylene homopolymers or ethylene copolymers with alpha-olefins of 3 to 10 carbon atoms, comprising a catalyst precursor and a trialkylaluminum cocatalyst to activate said catalyst precursor, wherein the precursor comprises (i) silica, wherein the silica has 0.4 to 0.9 mmol of OH groups per gram of silica;

(ii) a dialkylmagnesium compound $R_mMgR'_n$, wherein each of R and R' is an alkyl group of 4 to 10 carbon atoms, and wherein m plus n equal the valance of magnesium, wherein the dialkylmagnesium compound is present in an amount to provide a molar (Mg):(OH) ratio of 1:1 to 4:1;

(iii) tetraalkyl orthosilicate in which the alkyl group contains 2 to 6 carbon atoms, in an amount to provide a (tetraalkyl orthosilicate):(Mg) molar ratio of about 0.40 to about 1.0;

(iv) $TiCl_4$, in an amount to provide a molar (Ti):(Mg) ratio of 0.7 to 1.4, wherein the catalyst precursor composition is characterized by a K value which is defined as K=(Ti)/{(Mg)+4(Si)}, wherein (Ti) is titanium molar concentration provided by $TiCl_4$, (Mg) is magnesium molar concentration provided by said dialkylmagnesium compound; (Si) is the silicon molar concentration provided by said tetraalkyl orthosilicate, wherein each of said concentrations of Ti, Mg and Si is calculated in units of mmole/gram of silica, and K is less than 0.4.

2. The catalyst of claim 1, wherein the precursor is formed by the steps comprising (a) providing a slurry of silica in a non-polar solvent, wherein the silica has 0.4 to 0.9 mmol of OH groups per gram of silica;

(b) contacting said silica with said dialkylmagnesium compound in an amount to provide a molar (Mg):(OH) ratio of 1:1 to 4:1, to impregnate said silica, and to form a step (b) product;

(c) adding to said step (b) product tetraalkyl orthosilicate):(Mg) molar ratio of about 0.40 to about 1.00; and to form a step (c) product; and (d) contacting said step (c) product with $TiCl_4$, in an amount to provide a molar (Ti):(Mg) ratio of 0.7 to 1.4 to form said catalyst precursor.

3. A catalyst composition for production of ethylene homopolymers and ethylene copolymers with alpha-olefins of 3 to 10 carbon atoms, comprising a catalyst precursor and a trialkylaluminum cocatalyst to activate said catalyst precursor, wherein the precursor comprises (i) silica, wherein the silica has 0.4 to 0.9 mmol of OH groups per gram of silica;

(ii) dibutylmagnesium, in an amount to provide a molar (Mg):(OH) ratio of 1:1 to 4:1;

(iii) tetraethyl orthosilicate, in an amount to provide a (tetraethyl orthosilicate):(Mg) molar ratio of about 0.40 to about 1.0;

(iv) $TiCl_4$, in an amount to provide a molar (Ti):(Mg) ratio of 0.7 to 1.4 wherein the catalyst precursor composition is characterized by a K value which is defined as K=(Ti)/{(Mg)+4(Si)}, wherein (Ti) is titanium molar concentration provided by $TiCl_4$, (Mg) is magnesium molar concentration provided by said dibutylmagnesium; (Si) is the silicon molar concentration provided by said tetraethyl orthosilicate, wherein each of said concentrations of Ti, Mg and Si is calculated in units of mmole/gram of silica, and K is less than 0.4; and wherein the cocatalyst is triethylaluminum.

4. A catalyst composition for production of ethylene homopolymers or ethylene copolymers with alpha-olefins of 3 to 10 carbon atoms, comprising a catalyst precursor and a trialkylaluminum cocatalyst to activate said catalyst precursor, wherein the precursor comprises (i) silica, wherein the silica has 0.4 to 0.9 mmol of OH groups per gram of silica;

(ii) dibutylmagnesium, in an amount to provide a molar (Mg):(OH) ratio of 1:1 to 4:1;

(iii) tetraalkyl orthosilicate in which the alkyl group contains 2 to 6 carbon atoms, in an amount to provide a (tetraalkyl orthosilicate):(Mg) molar ratio of about 0.40 to about 1.0;

(iv) $TiCl_4$, in an amount to provide a molar (Ti):(Mg) ratio of 0.7 to 1.4, wherein the catalyst precursor composition is characterized by a K value which is defined as (Ti)/{(Mg)+4(Si)}, wherein (Ti) is titanium molar concentration provided by $TiCl_4$, (Mg) is magnesium molar concentration provided by said dibutylmagnesium; (Si) is the silicon molar concentration provided by said tetraalkyl orthosilicate, wherein each of said concentrations of Ti, Mg and Si is calculated in units of mmole/gram of silica, and K is less than 0.4.

5. A catalyst composition for production of ethylene homopolymers or ethylene copolymers with alpha-olefins of 3 to 10 carbon atoms, comprising a catalyst precursor and a trialkylaluminum cocatalyst to activate said catalyst precursor, wherein the precursor comprises (i) silica, wherein the silica has 0.4 to 0.9 mmol of OH groups per gram of silica;

(ii) a dialkylmagnesium compound $R_mMgR'_n$, wherein each of R and R' is an alkyl group of 4 to 10 carbon atoms, and wherein m plus n equal the valance of magnesium, wherein the dialkylmagnesium compound is present in an amount to provide a molar (Mg):(OH) ratio of 1:1 to 4:1;

(iii) tetraethyl orthosilicate, in an amount to provide a (tetraethyl orthosilicate):(Mg) molar ratio of about 0.40 to about 1.0;

(iv) $TiCl_{41}$ in an amount to provide a molar (Ti):(Mg) ratio of 0.7 to 1.4, wherein the catalyst precursor composition is characterized by a K value which is defined as K=(Ti)/{(Mg)+4(Si)}, wherein (Ti) is titanium molar concentration provided by said $TiCl_4$; (Mg) is magnesium molar concentration provided by said $R_mMgR'_n$; (Si) is the silicon molar concentration provided by said tetraethyl orthosilicate, wherein each of said concentration of Ti, Mg and Si; is calculated in units of mmole/gram of silica; and K is less than 0.4.

* * * * *